P. B. SHELDON.
Broom Clasp.
No. 24,582.
Patented June 28, 1859.
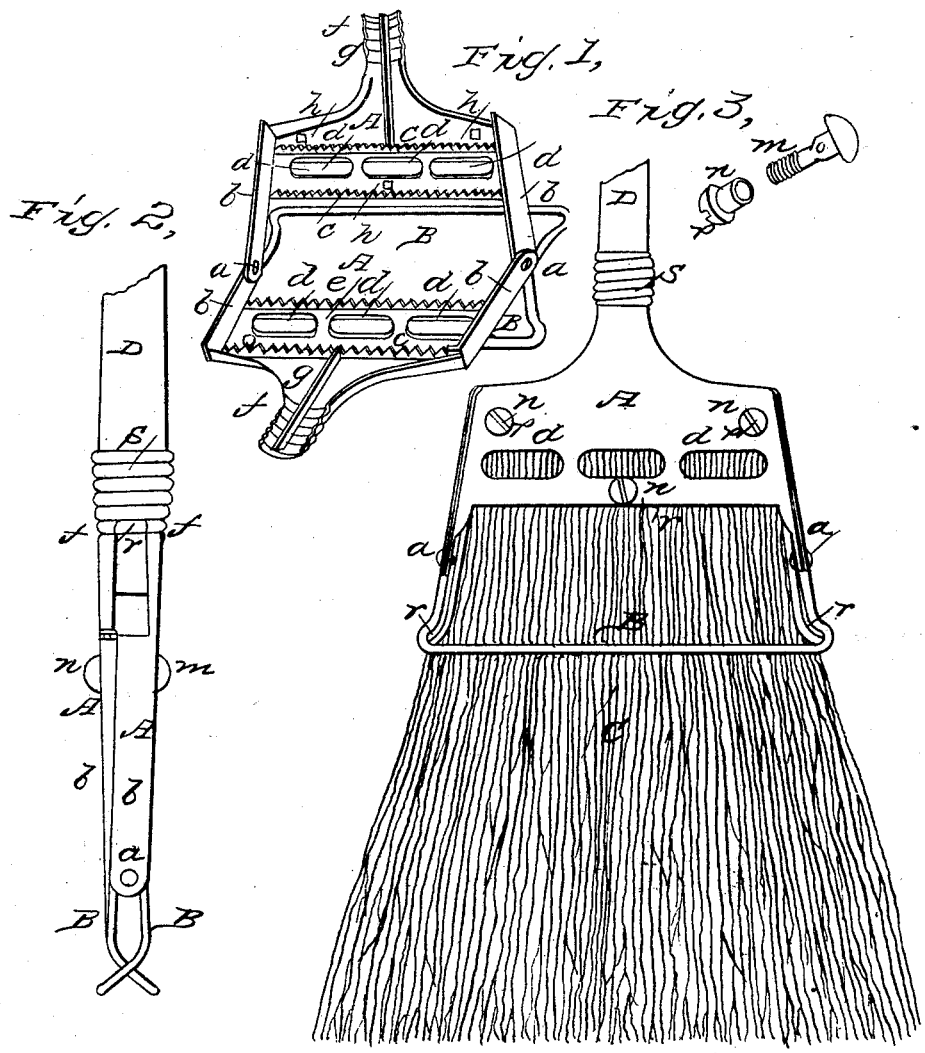
WITNESSES:
S. J. Allis
John T. Upson
INVENTOR:
Philo B Sheldon

UNITED STATES PATENT OFFICE.

PHILO B. SHELDON, OF PRATTSBURG, NEW YORK, ASSIGNOR TO HIMSELF, AND J. T. UPSON, OF HURON, NEW YORK.

BROOM-CLASP.

Specification of Letters Patent No. 24,582, dated June 28, 1859.

*To all whom it may concern:*

Be it known that I, PHILO B. SHELDON, of Prattsburg, in the county of Steuben and State of New York, have invented a new and Improved Broom and Brush Clasp; and I do hereby declare that the following is a full and exact description thereof, reference being had to the accompanying drawings, making part of this specification, Figure 1, being a view, in perspective, of the clasp open; Fig. 2, an edge view of the clasp closed, with the handle secured therein; Fig. 3, a side view of the clasp closed, with broom and handle complete; Fig. 4, view, in perspective, of a part detached.

Like letters designate corresponding parts in all the figures.

The jaws A, A, of the clasp are cut and shaped out of sheet-metal, their side edges b, b, being bent over, at right-angles, and pivoted together at a, a, thus furnishing the joint on which the jaws turn. They also have serrated projections c, c, on their inner surfaces, to assist in firmly holding the material C, composing the broom or brush. There may also be apertures cut through the jaws, as at d, d, of any ornamental form, and by turning their edges inward they serve to strengthen the jaws and assist in holding the broom material. To the bent edges b, b, of the two jaws, wires B, B, are respectively secured, by solder or otherwise, and extend downward, the one crossing the other substantially as represented. These wire lips (as they may be termed) serve to hold the broom or brush compact, without the usual sewing of twine or wire; and, by crossing each other, keep the edges thereof from fretting and wasting.

The shank portions f, f, of the jaws, are bent into a rounded and slightly taper or conical form, and provided with screw threads as represented. A thin, narrow rib, or feather g, is secured longitudinally in the bottom of each hollow shank; and, when the jaws are closed around the handle D, these feathers enter a slit sawed into the end of said handle, and thereby prevent it from turning around. The said feathers also serve to strengthen the shanks of the jaws. The end of the handle D, has a screw thread r, cut on its periphery, so as to fit into the screw threads of the shanks f, f, which, being shaped from sheet-metal, have their screw threads both in their inner and outer surfaces. A slightly conical, screw or nut ferrule s, fitting over the shanks, binds them fast around the handle, which is thus held by the screw threads and feathers g, g, very securely in the clasp.

The materials C, for the broom or brush, are inserted between the jaws A, A, while open. The jaws are then closed thereon, at the same time, receiving the handle D; and the conical ferrule s, tightens and holds all firmly together. In order further to secure the butts of the broom material between the jaws, and prevent any warping or yielding of the jaws, square holes h, h, (Fig. 1,) are made in one jaw, to receive screw-bolts m, with square bodies o; (Fig. 4;) and, opposite, in the other jaw, are holes i, i, to receive nuts n, with notched heads p. (Fig. 4.) These nuts are screwed in over the screws m, thereby drawing the jaws closely together, and firmly holding the broom or brush in place, the heads of the nuts and screws not projecting inconveniently.

The clasp may be cheaply made of cheap materials, is strong and durable; and when the material of one brush or broom is worn out, a new material may be quickly substituted, the same clasp thus answering for several renewals of material.

What I claim as my invention and desire to secure by Letters Patent, is—

1. The feathers, or ribs, g, g, in combination with the screw threads of the shanks f, f, and with the handle D, constructed as described, for the purposes specified.

2. I also claim the combination of the conical screw shanks f, f, conical screw ferrule s, and screw bolts and nuts m, n, arranged substantially as and for the purpose herein set forth.

3. I also claim the wires B, B, attached to the jaws A, A, and arranged in combination therewith in the manner and for the purpose described.

PHILO B. SHELDON.

Witnesses:
J. SMITH,
L. CORNWELL.